(12) United States Patent
Li et al.

(10) Patent No.: US 12,554,010 B2
(45) Date of Patent: Feb. 17, 2026

(54) SYSTEMS AND METHODS FOR SYNTHETIC APERTURE RADAR IMAGE COMPRESSION

(71) Applicant: AtomBeam Technologies Inc., Moraga, CA (US)

(72) Inventors: Zhu Li, Overland Park, KS (US); Paras Maharjan, Kansas City, MO (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 18/885,741

(22) Filed: Sep. 16, 2024

(65) Prior Publication Data

US 2026/0036692 A1     Feb. 5, 2026

Related U.S. Application Data

(63) Continuation-in-part of application No. 18/792,542, filed on Aug. 1, 2024.

(51) Int. Cl.
*G01S 13/90*     (2006.01)

(52) U.S. Cl.
CPC ................. *G01S 13/9027* (2019.05)

(58) Field of Classification Search
CPC .................................................. G01S 13/9027
See application file for complete search history.

(56) References Cited

U.S. PATENT DOCUMENTS

2023/0194731 A1*   6/2023   Parkins .................. G01S 19/04
                                                                 701/470

\* cited by examiner

*Primary Examiner* — Timothy A Brainard
(74) *Attorney, Agent, or Firm* — Galvin Patent Law LLC; Brian R. Galvin; Erin Johnston

(57) ABSTRACT

For compressing synthetic aperture radar (SAR) images, preprocessing operations are performed on an input SAR image. A discrete cosine transform is performed on the image, and multiple subbands are created, where each subband represents a particular range of frequencies. The subbands are organized into multiple groups, where the multiple groups comprise a first low frequency group, a second low frequency group, and a high frequency group. A latent space representation is generated corresponding to each of the multiple groups of subbands. A first bitstream is created based on the latent space representation, and an alternate representation of the latent space is used for creating a second bitstream, enabling multiple-pass techniques for SAR image data compression, including phase unwrapping for supporting interferometric SAR (InSAR) applications.

20 Claims, 12 Drawing Sheets

SYSTEMS AND METHODS FOR SYNTHETIC APERTURE RADAR IMAGE COMPRESSION

CROSS-REFERENCE TO RELATED APPLICATIONS

Priority is claimed in the application data sheet to the following patents or patent applications, each of which is expressly incorporated herein by reference in its entirety: Ser. No. 18/792,542

BACKGROUND OF THE INVENTION

Field of the Art

The present invention is in the field of data processing, and more particularly is directed to the problem of compressing synthetic aperture radar images.

Discussion of the State of the Art

Synthetic aperture radar (SAR) is a form of radar technology that is used to create high-resolution images of landscapes. Unlike traditional radar systems, which rely on a large physical antenna, SAR uses the motion of the radar platform (such as an aircraft or satellite) to simulate a much larger antenna, or "synthetic aperture." This allows SAR to achieve much higher resolution images than conventional radar. Accordingly, SAR can produce detailed images with resolutions that are often better than those obtained by optical sensors. Another benefit is that SAR can operate in any weather conditions (rain, fog, clouds) and during both day and night because it relies on microwave radiation, which can penetrate clouds and is independent of sunlight. Additionally, SAR can penetrate certain materials like vegetation, ice, and snow, allowing it to image objects or features hidden beneath these materials. Due to its capabilities, SAR images are well-suited for a wide variety of applications, including earth observation (via satellites), environmental monitoring, agriculture applications, military and defense applications, and more.

To acquire SAR images, the SAR system transmits a microwave signal towards the ground. The transmitted signal reflects off the surface and returns to the radar antenna. As the radar platform moves, it collects reflected signals from different positions along its path. These multiple reflections simulate a much larger antenna, creating a "synthetic aperture." The collected data is processed to form an image. The phase and amplitude of the reflected signals are used to reconstruct a high-resolution image of the surface. Thus, synthetic aperture radar is a powerful remote sensing technology that provides high-resolution images and valuable data across a range of applications. Its ability to operate under various conditions and penetrate materials that block optical sensors makes it an essential tool in earth observation, environmental monitoring, defense, agriculture, and many other fields. The advantages of SAR make it a valuable tool in modern remote sensing and imaging technologies.

SUMMARY OF THE INVENTION

Accordingly, there is disclosed herein, systems and methods for compressing and decompressing synthetic aperture radar (SAR) images. Disclosed embodiments provide efficient techniques for compression and decompression that exploit properties of SAR images. As SAR images are often used in surveillance and remote sensing applications, the SAR images may be acquired from satellites, drones (unmanned ariel vehicles (UAVs)), aircraft, and other remote devices. The SAR images are then transmitted to one or more computing devices on the ground. Thus, in SAR image applications, network bandwidth can be at a premium. This is especially true in the cases where SAR image transfer involves communication between satellites in space, and earth-based ground stations. In applications where network bandwidth and/or data storage resources are limited or costly, the effectiveness of compression of SAR image data becomes important.

Disclosed embodiments address the aforementioned problems and shortcomings by performing a subband decomposition by utilizing a block-wise discrete cosine transform (DCT) decomposition, thereby enabling a compression technique that exploits properties inherent in SAR images. Moreover, disclosed embodiments are well-suited for parallelization for execution on a multi-core system and/or FPGA (field-programmable gate array) or ASIC (application specific integrated circuit) based system.

According to a preferred embodiment, there is provided a system for image compression, comprising: a computing device comprising at least a memory and a processor; an image preprocessing subsystem comprising a first plurality of programming instructions that, when operating on the processor, cause the computing device to perform one or more image preprocessing operations on an input synthetic aperture radar (SAR) image, wherein the input SAR image comprises an in-phase component and a quadrature component; a discrete cosine transform (DCT) subsystem comprising a second plurality of programming instructions that, when operating on the processor, cause the computing device to: perform a DCT operation on the in-phase component of the input SAR image, and create a plurality of subbands for the in-phase component of the input SAR image, wherein each subband represents a frequency range; and divide the plurality of subbands into multiple groups, wherein the multiple groups comprise a first low frequency group, a second low frequency group, and a high frequency group; a compression subsystem comprising a third plurality of programming instructions that, when operating on the processor, cause the computing device to implement a latent feature encoding network, wherein the latent feature encoding network comprises: a first kernel, the first kernel configured to provide output to a first plurality of residual blocks, the first plurality of residual blocks configured to provide output to a first attention network, the first attention network configured to provide output to a second plurality of residual blocks, the second plurality of residual blocks configured to provide output to a second kernel, and the second kernel configured to provide output to a second attention network, and wherein the latent feature encoding network is configured and disposed to generate a latent space representation corresponding to the input SAR image; a first arithmetic coding subsystem comprising a fourth plurality of programming instructions that, when operating on the processor, cause the computing device to perform compression on one or more of the plurality of subbands, thereby creating a first compressed bitstream; a hyperprior latent feature summarization module configured and disposed to receive input from the second attention network, and provide a refined and disentangled representation of one or more latent features as output; and a second arithmetic coding subsystem comprising a fifth plurality of programming instructions that, when operating on the processor, cause the computing device to perform compression on the output of the hyperprior latent feature summarization module, thereby creating a second compressed bitstream, wherein the first compressed bitstream and second compressed bitstream together represent a compressed version of the input SAR image.

According to another preferred embodiment, there is provided a method for image compression, comprising: performing one or more image preprocessing operations on an input synthetic aperture radar (SAR) image, wherein the input SAR image comprises an in-phase component and a quadrature component; performing a discrete cosine transform (DCT) operation on the in-phase component of the input SAR image, and create a plurality of subbands for the in-phase component of the input SAR image, wherein each subband represents a frequency range; dividing the plurality of subbands into multiple groups, wherein the multiple groups comprise a first low frequency group, a second low frequency group, and a high frequency group; generating a latent space representation corresponding to the multiple groups of subbands; generating a refined and disentangled representation of one or more latent features utilizing hyperprior latent feature summarization; creating a first compressed bitstream based on the latent space representation; and creating a second compressed bitstream based on output of the hyperprior latent feature summarization; wherein the first compressed bitstream and second compressed bitstream together represent a compressed version of the input SAR image.

According to another preferred embodiment, there is provided a non-transient, computer-readable medium comprising programming instructions for an electronic computation device executable by a processor to cause the electronic computation device to: perform one or more image preprocessing operations on an input synthetic aperture radar (SAR) image, wherein the input SAR image comprises an in-phase component and a quadrature component; perform a discrete cosine transform (DCT) operation on the in-phase component of the input SAR image, and create a plurality of subbands for the in-phase component of the input SAR image, wherein each subband represents a frequency range; divide the plurality of subbands into multiple groups, wherein the multiple groups comprise a first low frequency group, a second low frequency group, and a high frequency group; generate a latent space representation corresponding to the multiple groups of subbands; generate a refined and disentangled representation of one or more latent features utilizing hyperprior latent feature summarization; create a first compressed bitstream based on the latent space representation; and create a second compressed bitstream based on output of the hyperprior latent feature summarization; wherein the first compressed bitstream and second compressed bitstream together represent a compressed version of the input SAR image.

According to an aspect of an embodiment, it further includes performing a DCT operation on the quadrature component of the input SAR image, and create a second plurality of subbands for the quadrature component of the input SAR image.

According to an aspect of an embodiment, it further includes discarding one or more subbands prior to generating the latent space representation.

According to an aspect of an embodiment, it further includes performing one or more image preprocessing operations that include a radiometric calibration process.

According to an aspect of an embodiment, it further includes performing one or more image preprocessing operations that include a region of interest (ROI) extraction process.

According to an aspect of an embodiment, it further includes performing one or more image preprocessing operations that include a geometric calibration process.

According to an aspect of an embodiment, it further includes performing one or more image preprocessing operations that include a noise reduction process.

According to an aspect of an embodiment, it further includes performing a noise reduction process that includes a speckle filtering process.

According to an aspect of an embodiment, the discrete cosine transform (DCT) subsystem further comprises programming instructions that when operating on the processor, cause the processor to perform a DCT operation on the quadrature component of the input SAR image, and create a second plurality of subbands for the quadrature component of the input SAR image.

According to an aspect of an embodiment, the compression subsystem further comprises programming instructions that when operating on the processor, cause the processor to discard one or more subbands prior to generating the latent space representation.

According to an aspect of an embodiment, the compression subsystem further comprises programming instructions that when operating on the processor, cause the processor to implement a context network, wherein the context network is configured to compute a thumbnail version of the latent space representation.

According to an aspect of an embodiment, there is provided a subbands decoding subsystem comprising a fifth plurality of programming instructions stored in the memory and operable on the processor, wherein the fifth plurality of programming instructions, when operating on the processor, cause the computing device to implement a multi-stage context recovery subsystem, wherein the multi-stage context recovery subsystem comprises a first loss function associated with the first low frequency group, a second loss function associated with the second low frequency group, and a third loss function associated with the high frequency group.

According to an aspect of an embodiment, at least one of the first loss function, second loss function, and third loss function is based on a weighting scheme.

According to an aspect of an embodiment, at least one of the first loss function, second loss function, and third loss function is optimized for amplitude recovery.

According to an aspect of an embodiment, the hyperprior latent feature summarization module is configured to compute a thumbnail version of the latent space representation.

According to an aspect of an embodiment, the hyperprior latent feature summarization module comprises a Hierarchical Bayesian Network (HBN).

According to an aspect of an embodiment, the first kernel is configured to have five channels and a stride value of 1.

According to an aspect of an embodiment, the second kernel is configured to have 5 channels and a stride value of 2.

According to an aspect of an embodiment, the first plurality of residual blocks comprises six residual blocks.

According to an aspect of an embodiment, the second plurality of residual blocks comprises three residual blocks.

According to an aspect of an embodiment, there is provided a computer-readable medium further comprises programming instructions that, when executed by the processor, cause the electronic computation device to: derive an amplitude component and a phase component from the input SAR image; performing a first pass of amplitude compression, using a first neural network; perform a second pass of amplitude compression, using a second neural network; obtain interferogram wrapped phase information from the phase component; and perform a phase unwrap process to obtain an unwrapped phase based on the output for the first neural network, the second neural network, and the interferogram wrapped phase information.

BRIEF DESCRIPTION OF THE DRAWING FIGURES

Figure 1:
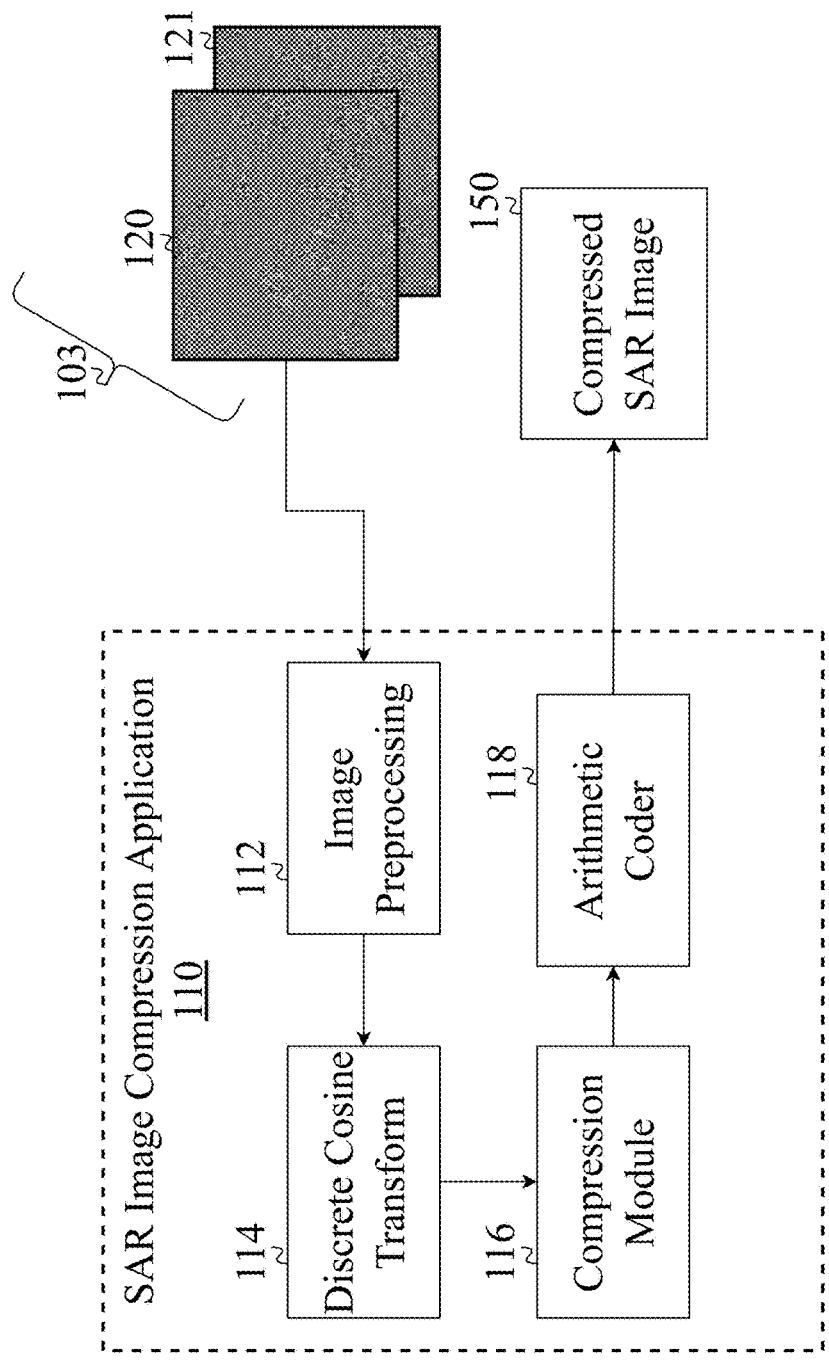
FIG. 1 is a block diagram illustrating an exemplary system architecture for compressing synthetic aperture radar (SAR) images, according to an embodiment.

The drawings are not necessarily to scale. The drawings are merely schematic representations, not intended to portray specific parameters of the disclosed embodiments. The drawings are intended to depict only typical embodiments of the invention, and therefore should not be considered as limiting in scope.

DETAILED DESCRIPTION OF THE INVENTION

Sending large amounts of SAR image data from sensors, aircraft, drones, or satellites can pose several challenges. Limited available bandwidth can restrict the rate at which data can be transmitted, especially for satellite communication where bandwidth is shared among multiple users. High latency in communication links, especially in satellite communication, can delay the transmission of data, which may be critical for real-time SAR imaging applications. Transmitting large amounts of data requires more power, which can be a limitation for battery-powered sensors or satellites. Furthermore, transmitting large amounts of data over long distances, especially for satellite communication, can be costly due to bandwidth charges and other fees. Additionally, storing large amounts of SAR image data before transmission, especially in remote or space-constrained environments, can be challenging and may require efficient storage solutions.

Disclosed embodiments address the aforementioned issues with a novel approach that includes performing a highly efficient complex valued SAR image compression and decompression. This can include performing tasks of amplitude and phase recovery for applications including, but not limited to, Automatic Target Recognition (ATR), Coherent Change Detection (CCD), and tomography from SAR images. Disclosed embodiments provide a hardware acceleration ready subband learning-based compression solution for SAR image compression, which utilizes divide-and-conquer strategy in dealing with redundancy in images by having a neural network encoder of latent representation, followed by a multi-stage context model that drives an arithmetic coding engine. Thus, disclosed embodiments provide techniques that are well-suited for hardware acceleration and implementable on efficient, scalable hardware such as multi-GPU (Graphics Processing Unit) processors and/or FPGA-based systems. Thus, disclosed embodiments can be efficiently deployed to various platforms ranging from UAVs to satellites, with significantly improved compression efficiency over the current state of the art, which translates into more capabilities for a given area of operations.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing subsystems, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "synthetic aperture radar" refers to an active remote sensing technique that combines data from multiple shorter acquisitions to simulate a larger antenna.

The term "neural network" refers to a computer system modeled after the network of neurons found in a human brain. The neural network is composed of interconnected nodes, called artificial neurons or units, that work together to process complex information.

The term "bitstream" refers to a binary sequence of data representing the compressed version of input data.

The term "autoencoder" refers to a type of neural network architecture that can learn compact representations of data.

Conceptual Architecture

FIG. 1 is a block diagram illustrating an exemplary system architecture for compressing synthetic aperture radar (SAR) images, according to an embodiment. A SAR image 103 is input to the SAR image compression application 110. The SAR image 103 can include a first component 120 and a second component 121. In embodiments, the first component 120 comprises an amplitude component and the second component 121 comprises a phase component. The amplitude refers to the magnitude or strength of a signal. It can be represented as the absolute value of a complex signal. The phase represents the timing or position of the signal relative to a reference. In embodiments, the phase may be represented in units of degrees or radians. In one or more embodiments, the first component 120 comprises an in-phase (I) component, and the second component 121 comprises a quadrature (Q) component. The in-phase component represents the real part of a complex signal. The in-phase component corresponds to the amplitude of the signal when it is in phase with a reference. The quadrature component represents the imaginary part of the complex signal. The quadrature component corresponds to the amplitude of the signal when it is 90 degrees out of phase with the reference.

In one or more embodiments, one, or both of the components may be processed by the SAR image compression application 110. The SAR image compression application 110 can include an image preprocessing subsystem 112. The image processing subsystem can perform one or more operations on the first component 120 and/or second component 121. The preprocessing can include a radiometric calibration process to correct the SAR image for sensor-specific biases and noise, ensuring that the pixel values accurately represent the radar backscatter of the surface. The preprocessing can include a geometric calibration process to correct geometric distortions caused by the motion of the SAR imaging sensor and the Earth's curvature. The preprocessing can include noise reduction. The noise reduction can include speckle filtering to reduce speckle noise, which may be present in acquired SAR images due to the coherent nature of radar signals. In one or more embodiments, techniques including a Lee filter, Frost filter, and/or Gamma MAP filter may be used for the speckle filtering. The noise reduction can include median filtering to reduce noise while preserving edges and fine details. The preprocessing can include contrast enhancement to improve the visibility of features. In one or more embodiments, techniques including, but not limited to, histogram equalization and adaptive contrast enhancement are used to perform contrast enhancement. The preprocessing can include edge enhancement. In one or more embodiments, the edge enhancement can be implemented with techniques including, but not limited to, Sobel and/or Canny edge detectors. The preprocessing can include geocoding and/or georeferencing. The geocoding can include converting the SAR image coordinates to a standard map projection, aligning it with geographical coordinates. The georeferencing can include aligning the SAR image with a geographic coordinate system using ground control points (GCPs). Other preprocessing techniques may be used instead of, or in addition to, the aforementioned preprocessing operations.

The preprocessed image data is input to discrete cosine transform (DCT) subsystem 114. The Discrete Cosine Transform (DCT) is a mathematical technique well-suited for signal and image processing. The DCT represents an image as a sum of sinusoids with varying magnitudes and frequencies. The discrete cosine transform subsystem 114 is configured to compute the two-dimensional DCT of an image, capturing essential features. In embodiments, the input image is divided into blocks (e.g., 8-by-8 or 16-by-16), and a DCT is computed for each block, yielding coefficients that are used as part of the compression/decompression process. In embodiments, the discrete cosine transform subsystem 114 comprises programming instructions that when operating on the processor, cause the processor to perform a DCT operation on the quadrature component of the input SAR image, and create a second plurality of subbands for the quadrature component of the input SAR image.

The output of the discrete cosine transform (DCT) subsystem 114 is input to the compression subsystem 116. The compression subsystem 116 is configured to implement a latent feature learning block, wherein the latent feature learning block is configured and disposed to generate a latent space representation corresponding to the multiple groups of subbands. The compression subsystem may perform pixel unshuffling on the output of the discrete cosine transform (DCT) subsystem 114 to create one or more subbands. In embodiments, the subbands include a DC subband, and one or more AC subbands, where each AC subband represents a frequency range. In embodiments, a DC subband and 15 AC subbands are used, for a total of 16 subbands (i.e., 16 channels).

The compression subsystem 116 may further perform subband grouping. The subband grouping can include grouping subbands into a high frequency (HF) group, and one or more low frequency (LF) groups. In embodiments, the compression subsystem 116 groups the subbands into two low frequency groups (LF1, and LF2), and a high frequency group (HF). In one or more embodiments, one or more subbands may be discarded. In embodiments, the discarding includes discarding one or more subbands in the high frequency group, as those subbands often do not contain large amounts of meaningful information that is beneficial for SAR image analysis. Accordingly, discarding one or more subbands can help improve the compression ratio of SAR images. The compression subsystem 116 may further include a neural network to process each subband individually. The neural network can include an autoencoder, an implicit neural representation (INR), a deep learning neural network, and/or other suitable neural network. In embodiments, the compression subsystem 116 comprises programming instructions that when operating on the processor, cause the processor to discard one or more subbands prior to generating the latent space representation. In embodiments, the compression subsystem 116 further comprises programming instructions that when operating on the processor, cause the processor to implement a context network, wherein the context network is configured to compute a thumbnail version of the latent space representation. In embodiments, the compression subsystem further comprises programming instructions that when operating on the processor, cause the processor to implement a multi-stage context recovery subsystem, wherein the multi-stage context recovery subsystem comprises a first loss function associated with the first low frequency group, a second loss function associated with the second low frequency group, and a third loss function associated with the high frequency group. In embodiments, at least one of the first loss function, second loss function, and third loss function is based on a weighting scheme. In embodiments, at least one of the first loss function, second loss function, and third loss function is optimized for amplitude recovery. In embodiments, at least one of the first loss function, second loss function, and third loss function is optimized for phase recovery.

The output of the compression subsystem 116 can be input to arithmetic coder subsystem 118. In embodiments, the arithmetic coder subsystem 118 is configured to represent a string of characters using a single fractional number between 0.0 and 1.0. Frequently occurring symbols are stored with fewer bits, while rare symbols use more bits. In one or more embodiments, the arithmetic coder subsystem 118 can implement adaptive arithmetic coding, in which case the arithmetic coder subsystem 118 adapts to changing probabilities during the encoding process. The output of the arithmetic coder subsystem 118 can serve as a compressed SAR image 150. A compressed SAR image such as compressed SAR image 150 can be efficiently transmitted from a satellite or aircraft to a ground station, where it can then be decompressed using corresponding decompression techniques.

Figure 2:
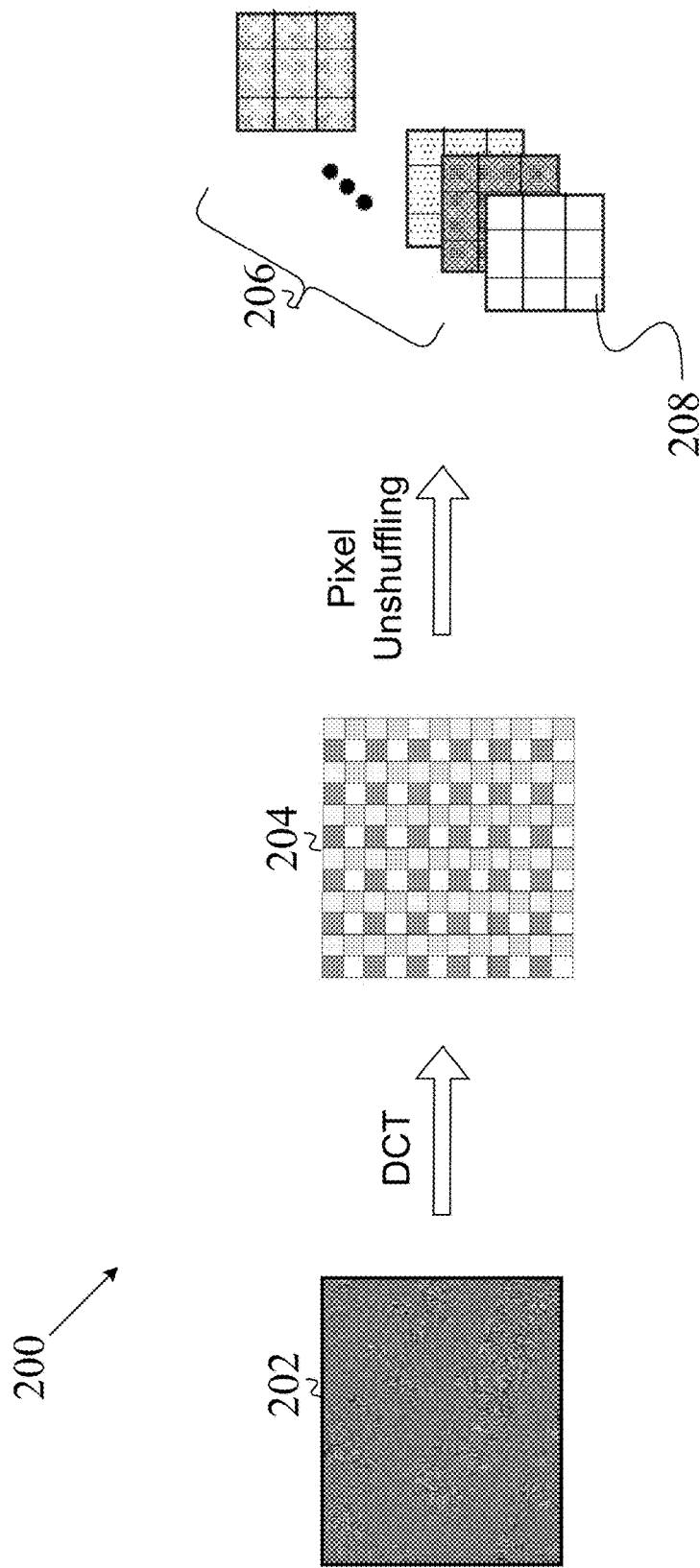
FIG. 2 is a block diagram showing details of SAR subbands, according to an embodiment.

FIG. 2 is a block diagram 200 showing details of SAR subbands, according to an embodiment. In the diagram 200, an input SAR image 202 has a DCT process performed on it to create a DCT representation 204. The DCT representation 204 then may have a pixel unshuffling process performed on it, to create subband array 206, which includes multiple AC subbands, each representing a range of frequencies, and a DC subband, indicated as 208. The DCT representation 204 includes a set of coefficients that represent the frequency components of the input SAR image 202. These coefficients capture information about the image's spatial frequencies and help compress it efficiently. When the input SAR image 202 is divided into blocks (e.g., 8×8 or 16×16), each block undergoes DCT. The DCT coefficients may initially be arranged in a zigzag pattern within the block. Pixel unshuffling rearranges these coefficients into a linear order. This linear order facilitates efficient storage and transmission of the compressed data. In embodiments, the linear order is one of row-major or column-major.

In one or more embodiments, the SAR image 202 may be stored in a format such as GeoTIFF. The GeoTIFF format embeds georeferencing information within the image file, allowing the SAR data to be easily aligned with geographic coordinates. Other formats for storing/representing the SAR image 202 may include, but are not limited to, Hierarchical Data Format 5 (HDF5), CEOS (Committee on Earth Observation Satellites), NITF (National Imagery Transmission Format), and/or other suitable formats. The SAR data, stored in one of the aforementioned formats, and/or other suitable format, may be stored in a complex format, in which each pixel contains a complex number in the form of: (I+jQ). The real part of the complex data represents the In-phase component (I), and the imaginary part of the complex data represents the Quadrature component (Q). Tools such as Python along with the GDAL (Geospatial Data Abstraction Library) library, can be used to read a SAR image. A mathematical package such as NumPy may be used to extract the real and/or imaginary parts of the SAR image for data compression. Computations including magnitude and phase calculations may be performed in parallel on one or more subbands, thereby enabling efficient implementation on multi-core and/or multi-processor hardware.

Disclosed embodiments can utilize different neural networks to learn efficient latent representations of the subbands, with their own loss function that is adaptive to the subsequent recovery tasks, i.e., for amplitude or phase recovery. Embodiments can include using a different loss function and training strategy on a subband basis, or a subband group basis. Embodiments can include an 8×8 block wise decomposition, comprising multiple groups of subbands. In embodiments, there are three groups of subbands. In embodiments, a first group (Group 1) includes sorted index from 1 to 36, including predominantly DC and low frequency information, and thus, can be referred to as a Low Frequency (LF) group, while group 2 can include a sorted channel index from 37 to 48, that includes mainly higher frequency info for which is referred to as High Frequency (HF) group, while the third group for the remaining channels, are mainly imaging noise for which can be discarded to further improve compression efficiency. With this decomposition, instead of compression SAR images of H×W×2 resolution, the resulting output includes subbands of (H/8)×(W/8)×2 images that have more intra-group statistical similarity for effective learning. Furthermore, the loss function can be optimized subband wise, to different tasks like amplitude vs phase recovery.

Figure 3:
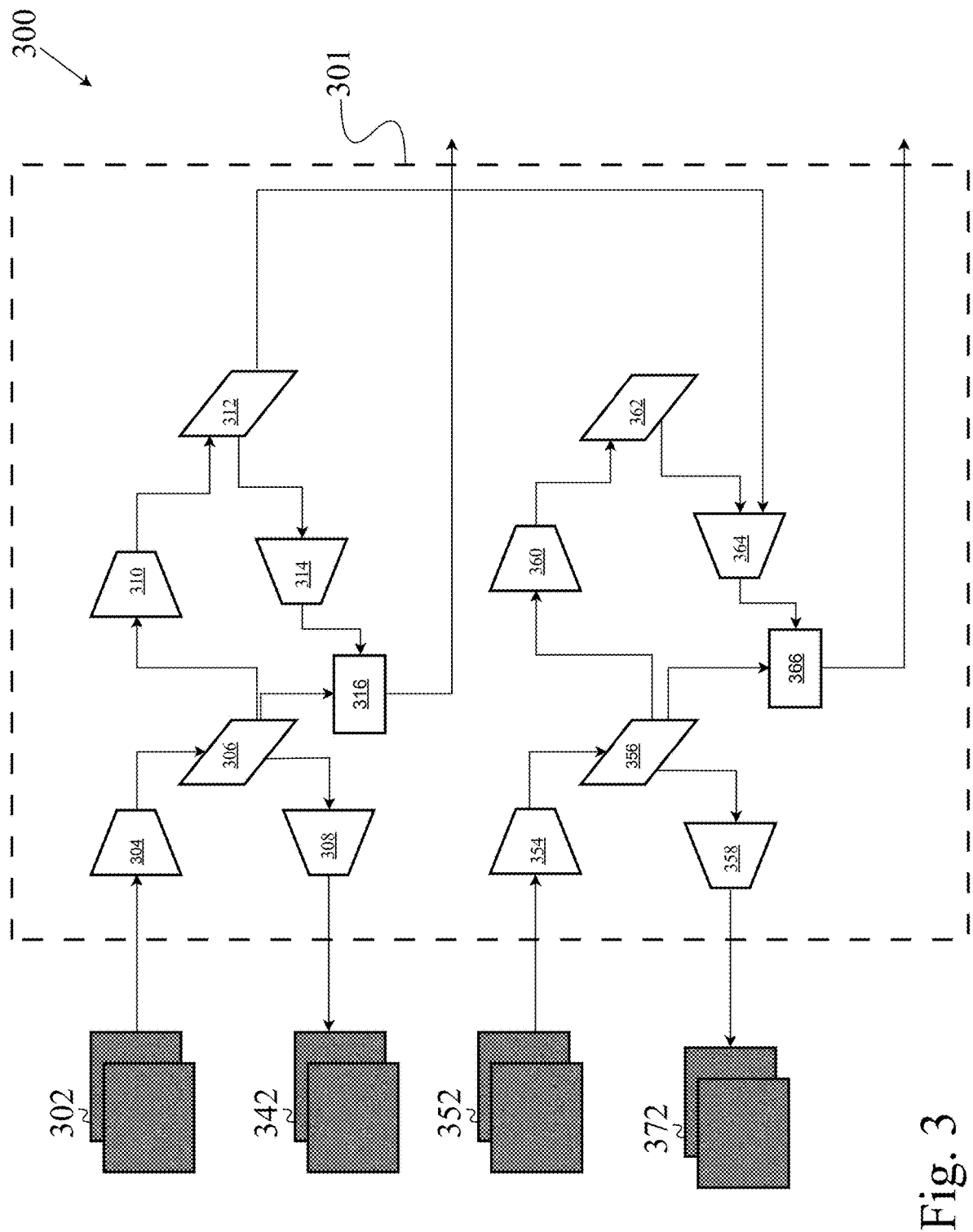
FIG. 3 is a block diagram illustrating details for subband-wise learning-based SAR image compression, according to an embodiment.

FIG. 3 is a block diagram 300 illustrating details for subband-wise learning-based SAR image compression, according to an embodiment. Block diagram 300 can represent a neural compact representation in which subband images are organized into LF and HF groups. For the LF group, the subbands can be further divided into LF1: {DC, AC1, AC2} and LF2, which includes the remaining AC subbands. Then a learning-based compression can be designed. The learning-based compression can include a latent feature learning block, which is equivalent to a transform, and then a context subsystem that codes context for an Arithmetic Coding (AC) engine.

Figure 4:
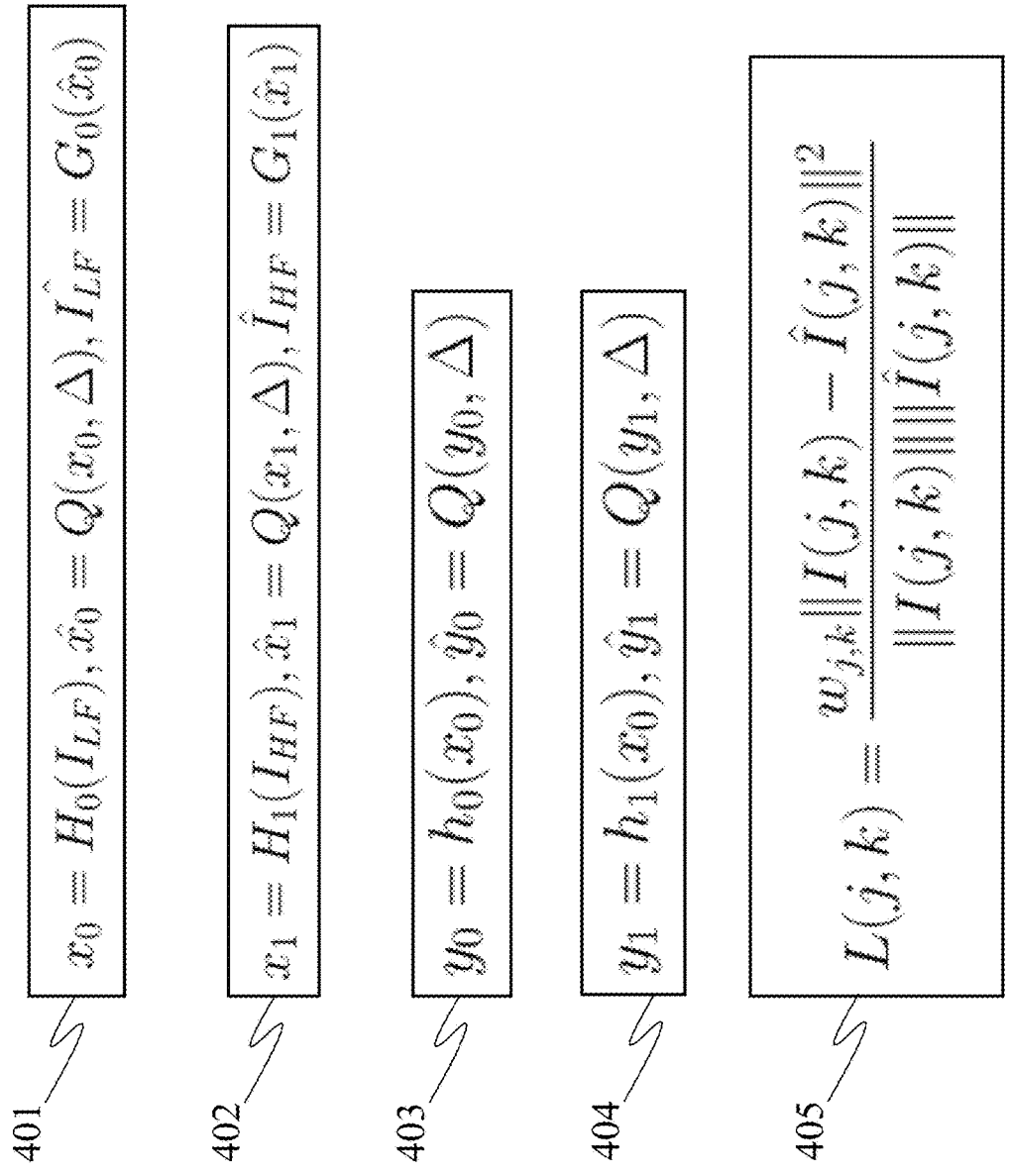
FIG. 4 illustrates formulas that may be used in an embodiment.

Input LF image components 302 are input to the neural compact representation 301 and is routed to block 304, which performs neural encoding to generate a latent representation, at block 306, at which point the input subbands of k channels of dimension (H/8)×(W/8)×2×k is $I_{LF}$, the neural encoder will give it a latent representation of $x_0$ of dimension h×w×N, as indicated in FIG. 4 at 401 and this is quantized and encoded with an arithmetic coder 316. Similarly, Input HF image components 352 are input to the neural compact representation 301 and is routed to block 354, which performs neural encoding to generate a latent representation, at block 356, at which point the input subbands of k channels of dimension (H/8)×(W/8)×2×k is $I_{LF}$, the neural encoder will give it a latent representation of $x_1$ of dimension h×w×N, as indicated in FIG. 4 at 402, and this is quantized and encoded with an arithmetic coder 366.

The flow of data continues from block 306 to block 308 which provides a latent feature representation subsystem, which outputs compressed LF image components 342, where the compressed LF image components 342 are compressed versions of input LF image components 302. Similarly, the flow of data continues from block 356 to block 358 which provides a latent feature representation subsystem, which outputs compressed HF image components 372, where the compressed HF image components 372 are compressed versions of input HF image components 352.

Additionally, the output of block 306 is provided to block 310 and arithmetic coder 316. The output of block 310 is routed to block 312, where a context y0 is computed, as indicated in FIG. 4 at 403. The output of block 312 is input to block 314 which in turn provides input to the arithmetic coder 316, which can provide an output that may be stored and/or transmitted. Similarly, the output of block 356 inputs to block 360, which inputs to block 362, where a context y1 is computed, as indicated in FIG. 4 at 404. The output of block 362 is routed to block 364, which inputs to arithmetic coder 366, which can provide an output that may be stored and/or transmitted. At the decoder side, the recovered latent feature will then be decoded back to the reconstructed subband images.

The same basic neural encoding and decoding is designed for the HF band. In one or more embodiments, a loss function Z may be used. In embodiments, the loss function L is implemented on a subband basis, and can be regularized with different weighting scheme for amplitude and phase recovery separately. For amplitude recovery, L1 loss on subband images may be used, while for the phase recovery, a loss function that has a different amplitude weighted scheme may be employed in order to achieve optimal performance. Referring to FIG. 4, an exemplary loss function is indicated at 405, in which, (j, k) are indices to a pixel offset and band number in the subband images, and $w_{j,k}$ is the weighting scheme that includes one or more hyperparameters to be optimized.

Detailed Description of Exemplary Aspects

Figure 5:
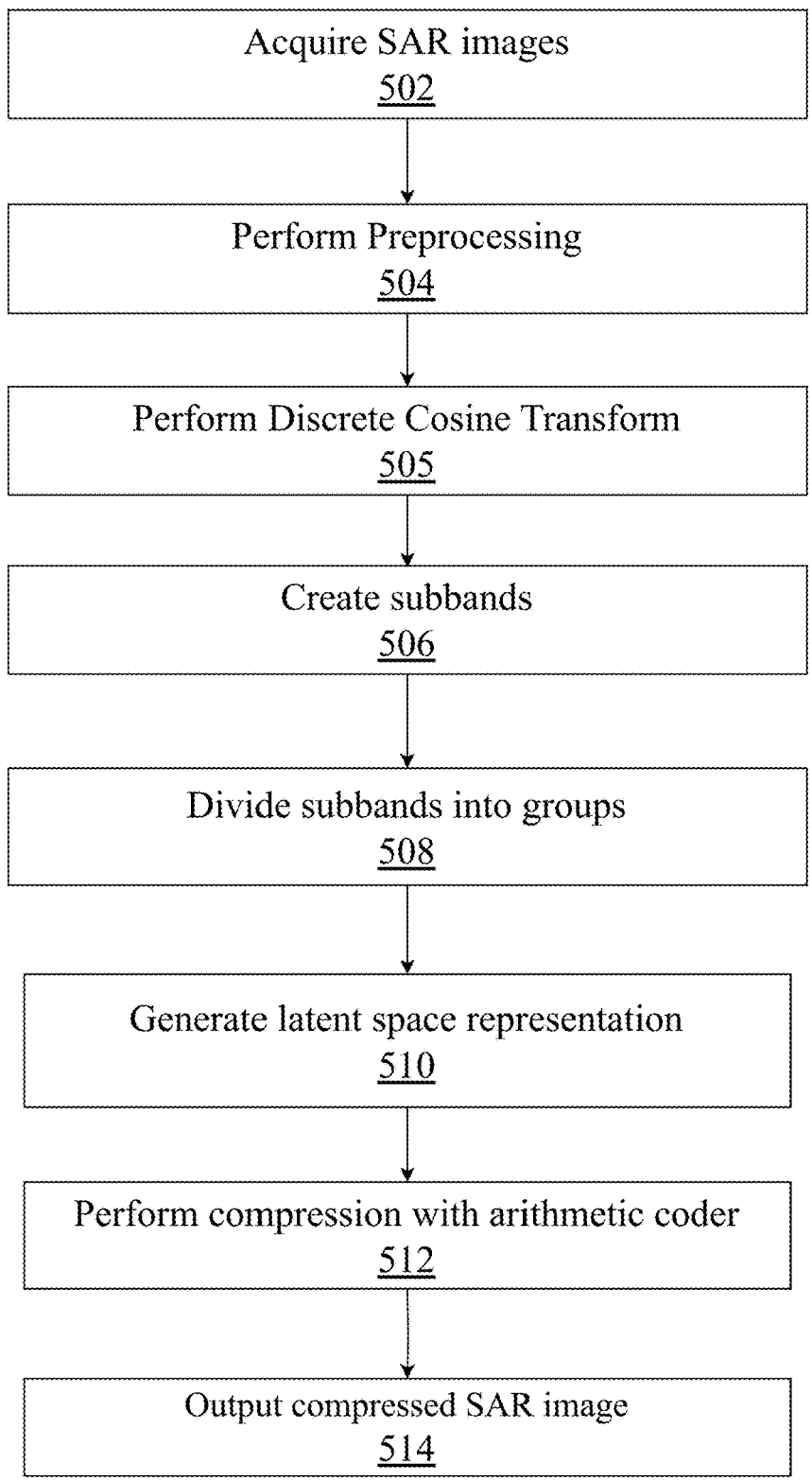
FIG. 5 is a flow diagram illustrating an exemplary method for compressing SAR image data, according to an embodiment.

FIG. 5 is a flow diagram illustrating an exemplary method 500 for compressing SAR image data, according to an embodiment. At block 502, SAR images are acquired. In embodiments, the SAR images can be stored in a format that represents pixels as complex numbers. The method 500 continues to block 504, where preprocessing is performed. The preprocessing can include image enhancement, filtering, noise reduction, edge enhancement, region of interest (ROI) identification, and so on. Additionally, the preprocessing can include adding metadata to the image. The metadata can include geographic information, date and/or time information, and/or other relevant information. Thus, in embodiments, the one or more image preprocessing operations includes a radiometric calibration process. In embodiments, the one or more image preprocessing operations includes a geometric calibration process. In embodiments, the one or more image preprocessing operations includes a noise reduction process. In embodiments, the noise reduction process includes a speckle filtering process. In embodiments, the one or more image preprocessing operations includes a region of interest (ROI) extraction process.

The method 500 continues to block 505, where a discrete cosine transform is performed. The discrete cosine transform can include performing a block-wise tokenization scheme. In embodiments, the discrete cosine transform may be performed utilizing a Discrete Cosine Transform Deblur (DCTD) network. The method 500 continues to block 506, where a plurality of subbands is created. The subbands can include a DC component, as well as multiple AC components of varying frequency ranges. The method 500 continues to block 508, where the subband is divided into groups. In embodiments two or more groups may be created, including one or more low frequency (LF) groups, and one or more high frequency (HF) groups. The method 500 continues with generating a latent space representation 510. In one or more embodiments, the latent space representation may be generated by an autoencoder on a subband basis. Embodiments can include discarding one or more subbands prior to generating the latent space representation. Embodiments can include computing a thumbnail version of the latent space representation. In embodiments, the latent space representation can be generated by a variational autoencoder instead of, or in addition to, an autoencoder. Thus, disclosed embodiments can transform raw data that can include complex pixel values of a SAR image into a suitable internal representation or feature vector. The method 500 continues to block 512, where compression is performed with an arithmetic coder. The arithmetic coder can perform compression of latent space representations on a subband basis. The method 500 continues to block 514, where a compressed SAR image is output.

Figure 6:
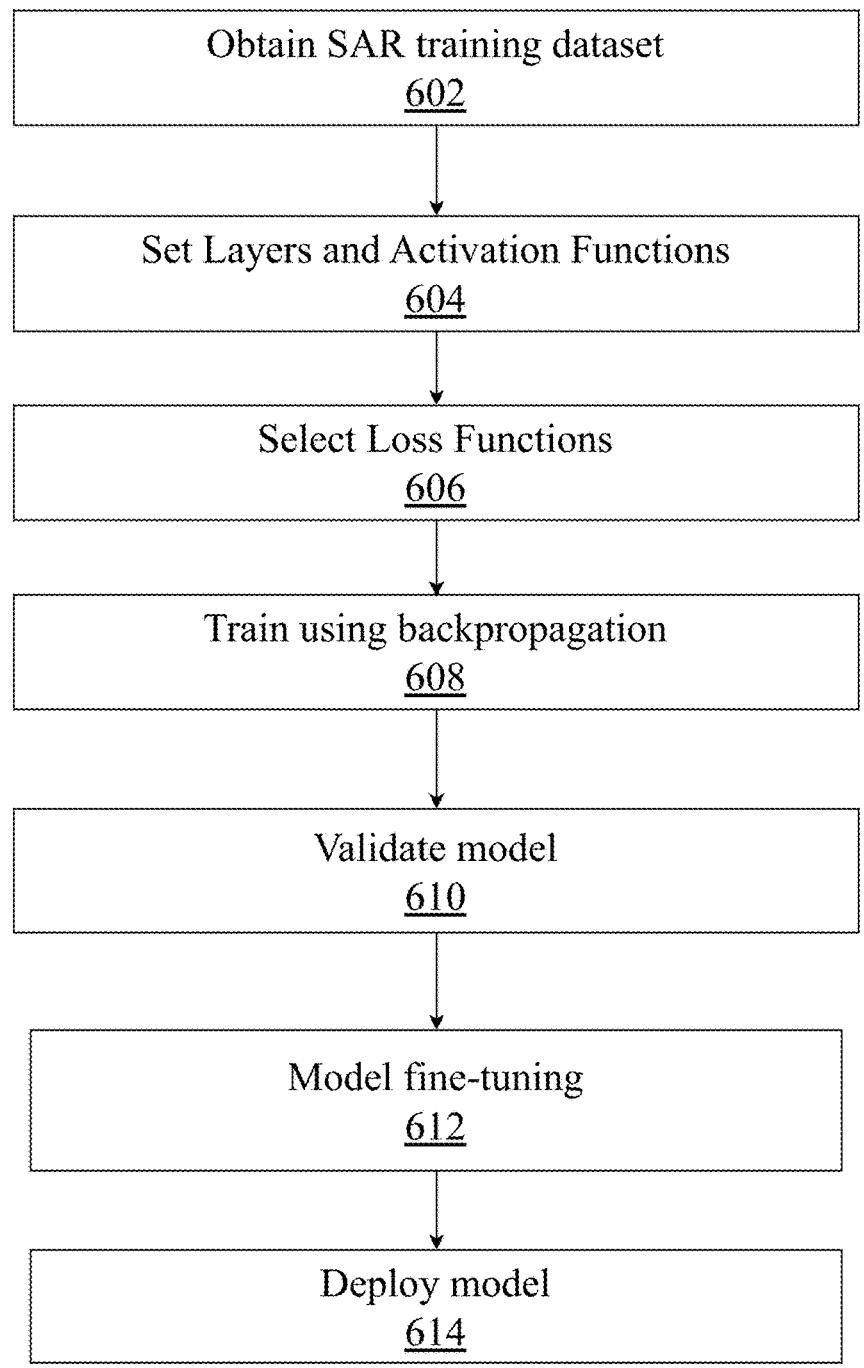
FIG. 6 is a flow diagram illustrating an exemplary method for training a system for compressing and restoring telemetry data, according to an embodiment.

FIG. 6 is a flow diagram illustrating an exemplary method for training a system for compressing and restoring telemetry data, according to an embodiment. The method 600 starts with obtaining a SAR training dataset at block 602. The SAR training dataset can include multiple SAR images acquired under a variety of conditions. The method 600 continues with setting layers and activation functions at block 604. In a neural network, layers are the building blocks that form the structure of the network. Each layer consists of a collection of neurons (also called nodes or units), and each neuron performs a specific computation on the input data. The output of one layer becomes the input to the next layer, creating a series of transformations from the input to the output. The layers can include input layers, output layers, and/or hidden layers. The activation functions introduce non-linearity into the model, allowing it to learn and represent complex patterns in the data. In embodiments, the activation functions can include a sigmoid function, a hyperbolic tangent function, a rectified linear unit (ReLU), a Leaky ReLU, softmax function, and/or other suitable activation function. The method 600 continues to block 606 for selecting loss functions. The loss functions are mathematical functions used in machine learning to measure the difference between the predicted values produced by the model and the actual target values from the training data. In one or more embodiments, the loss functions can include Mean Squared Error (MSE), Mean Absolute Error (MAE), Categorical Cross-Entropy, and/or other suitable loss functions. The loss functions can be used to determine if the model is sufficiently trained. The method 600 continues to block 608 for training the model using backpropagation. The backpropagation process can include computing gradients of the loss with respect to the weights and biases in the output layer. These gradients are propagated backward through the neural network to the hidden layer. The method 600 continues to block 610, where the model is validated. The validation can include using an additional set of SAR images that were not part of the SAR training dataset as a test dataset. The test SAR images can be compressed, reconstructed, and the reconstructed SAR images can be compared with the original SAR test dataset to confirm proper operation of the model. The method 600 can include model fine-tuning at block 612. The model fine-tuning can include adjusting weights and/or other hyperparameters as needed to improve model output. The method 600 continues to block 614, where the model is deployed for use in satellites, aircraft, and/or other sources of SAR images. In this way, disclosed embodiments provide an efficient compression technique for compressing SAR images.

Figure 7:
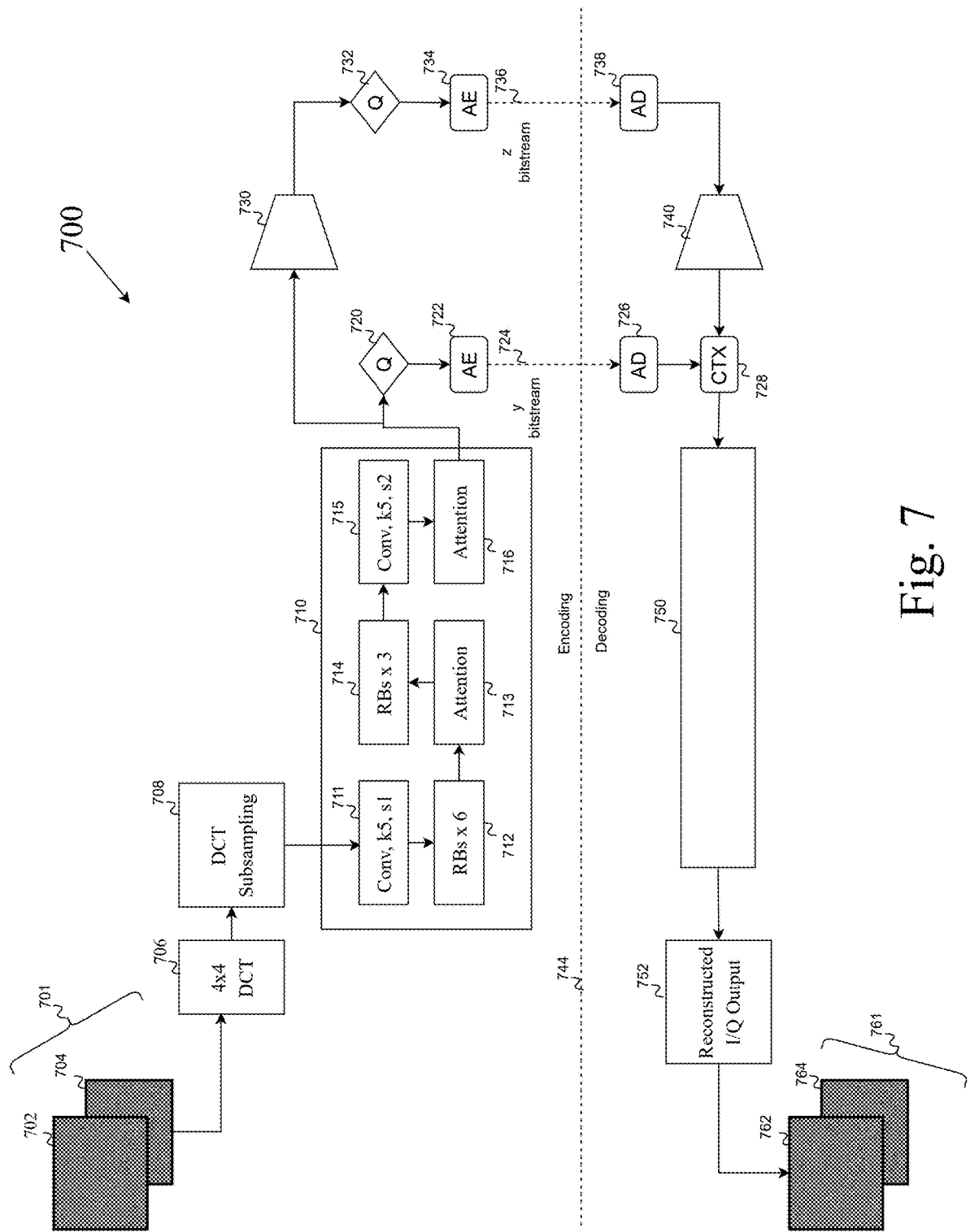
FIG. 7 is a drawing of an end-to-end architecture for SAR image compression, according to an embodiment.

FIG. 7 is a drawing of an end-to-end architecture for SAR image compression, according to an embodiment. The architecture 700 receives as input, a SAR image 701 that includes an in-phase component 702 and a quadrature component 704. The SAR image data (702, 704) is input to a 4×4 DCT block 706. The output of the DCT block 706 is input to DCT subsampling module 708. The output of the DCT subsampling module 708 is input to a compression neural network 710. The compression neural network 710 can include multiple components. In the architecture 700, data input to the compression neural network 710 is routed to convolutional neural network 711. In one or more embodiments, the convolutional neural network 711 has a kernel size of five channels and a stride of 1. In one or more embodiments, the first kernel is configured to have five channels and a stride value of 1. The output of the convolutional neural network 711 is input to first residual block array 712. Residual block array 712 may include a plurality of residual blocks. In one or more embodiments, the first plurality of residual blocks comprises six residual blocks. In one or more embodiments, the residual blocks may be used to mitigate the vanishing gradient problem and improve training efficiency. In embodiments, the residual blocks may include one or more convolutional layers, batch normalization layers, and/or activation functions such as ReLU, softmax, sigmoid, swish, leaky ReLU, and/or other suitable activation functions.

The output of residual block array 712 is input to attention mechanism 713. The attention mechanism can include a query (Q) that represents a vector used to query the relevant information from the data, a key (K) that represents a vector that the query is compared against to determine relevance, and a value (V) that represents a vector containing the actual information or data to be used. In one or more embodiments, attention scores are generated, based on a dot product of the query and key vectors. The attention mechanism may also provide normalization, such as via a softmax function, or other suitable technique.

The output of the attention mechanism 713 is provided to a second residual block array 714. Residual block array 714 may include a plurality of residual blocks. In one or more embodiments, the second plurality of residual blocks comprises three residual blocks. The output of residual block array 714 is input to a second convolutional neural network 715. In one or more embodiments, the convolutional neural network 715 has a kernel size of five channels and a stride of 2. In one or more embodiments, the second kernel is configured to have five channels and a stride value of 2. The output of the convolutional neural network 715 is input to second attention network 716. The output of second attention network 716 can serve as the final stage of the compression neural network 710. The output of the compression neural network 710 can be input to a quantizer module 720. The output of the quantizer module 720 is input to arithmetic encoder 722, to create a first bitstream 724, referred to as the 'y bitstream.'

Additionally, the output of the compression neural network 710 can be input to hyperprior latent feature summarization module 730. The hyperprior latent feature summarization module 730 can be used to implement a hierarchical Bayesian approach to improve the representation and disentanglement of latent features. The latent features can include compressed representations of data that capture essential characteristics of SAR images. The summarization can include extracting and representing the most important features from the latent space. The output of the hyperprior latent feature summarization module 730 can be input to a quantizer module 732. The output of the quantizer module 732 is input to arithmetic encoder 734, to create a second bitstream 736, referred to as the 'z bitstream.'

The components illustrated above line 744 represent components used for encoding (compressing) SAR image data. The bitstream 724 and bitstream 736 may be transmitted via wireless protocols such as S-Band, X-Band, Ka-Band, C-band, Ku-Band, VHF, UHF, and/or other suitable wireless protocols. Additionally, the bitstream 724 and bitstream 736 may be transmitted via a variety of modulation schemes, including Phase Shift Keying protocols such as BPSK, QPSK, and/or 8PSK, Frequency Shift Keying (FSK), and/or other suitable modulation schemes.

Components shown below line 744 are used in decoding (decompressing) SAR image data. In one or more embodiments, the components above line 744 may reside at the source of SAR image data acquisition, such as in a satellite or aerial vehicle. In one or more embodiments, the components below line 744 may reside at a destination where the compressed SAR image data is received, such as a ground station. For decoding, the bitstream 724 is input to arithmetic decoder 726, while the bitstream 736 is input to arithmetic decoder 738. The output of the arithmetic decoder 726 is input to context model (CTX) 728. The context model 728 can perform grouping of latent features into distinct groups according to their energy. The context model 728 can serve to optimize the decoding process by enabling reuse of decoded latent feature elements in context modeling. The output of arithmetic decoder 738 is input to the hyperprior latent feature summarization module 740. The output of the hyperprior latent feature summarization module 740 is input to context model (CTX) 728. The output of context model 728 is input to decompression neural network 750 which may include components similar to those described for compression neural network 710, and trained for the task of decompression. The output of the decompression neural network 750 is reconstructed I/Q (in-phase/quadrature) output 752, which includes reconstructed SAR image 761 that comprises an in-phase component 762 and a quadrature component 764.

Figure 8:
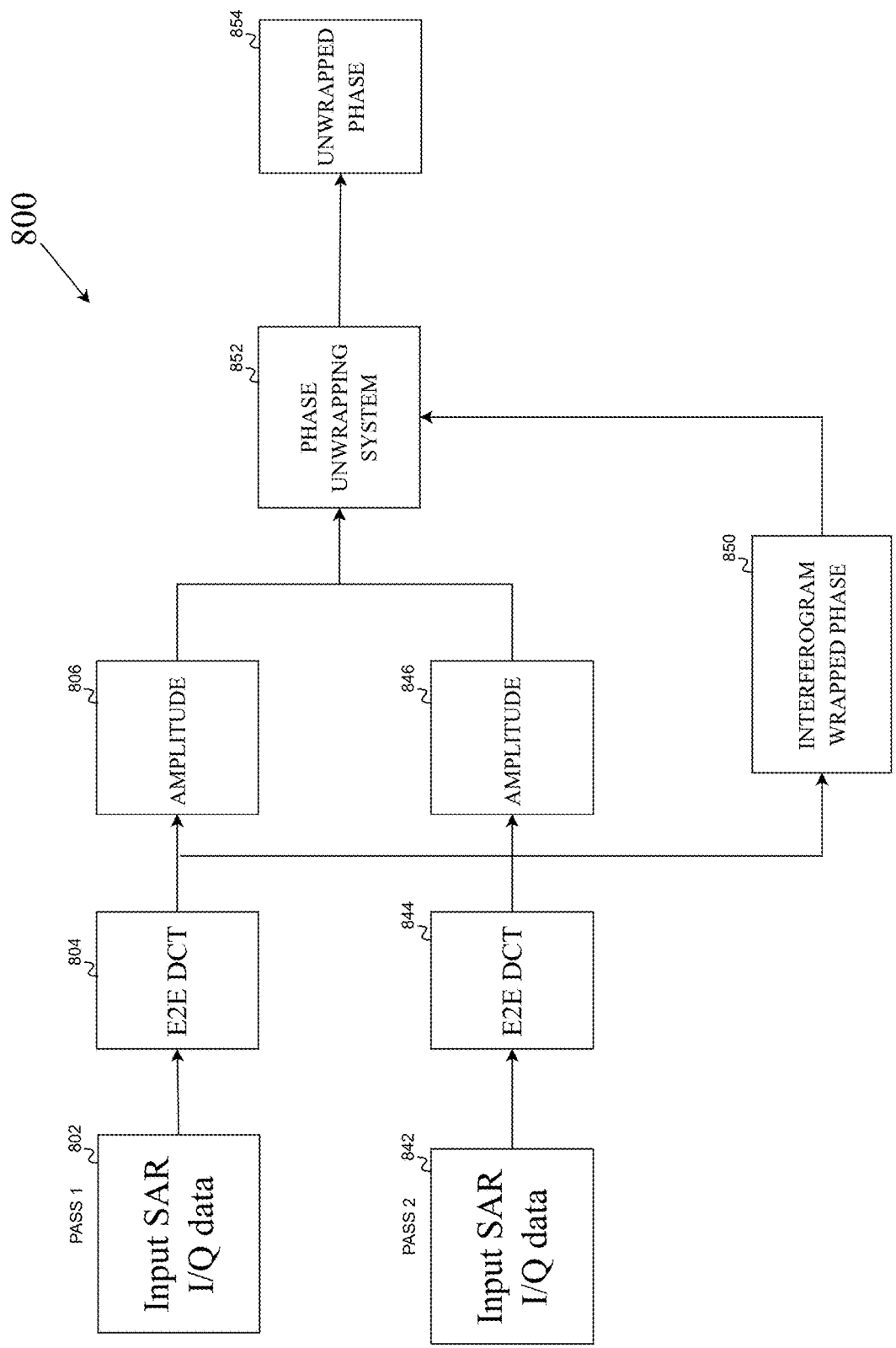
FIG. 8 is a drawing of an architecture for neural learning for interferometric synthetic aperture radar phase recovery and unwrapping, according to an embodiment.

FIG. 8 is a drawing of an architecture 800 for neural learning for interferometric synthetic aperture radar phase recovery and unwrapping, according to an embodiment. Interferometric Synthetic Aperture Radar (InSAR) is a remote sensing technique used to measure ground deformation and surface changes. InSAR leverages the principles of radar interferometry. The SAR technique uses radar to create high-resolution images of the Earth's surface. SAR equipment sends out microwave signals and records the return signals (echoes) that bounce back from the surface. InSAR involves combining two or more SAR images taken from slightly different positions or times. By analyzing the phase differences between the signals, precise measurements of surface displacement can be made. One or more embodiments utilize the phase difference between radar signals. When two SAR images of the same area are captured, the differences in the phase of the returned signals can be analyzed. In embodiments, the phase information is used to generate an interferogram, which is a map showing the phase differences. These differences can indicate changes in elevation or ground movement. These features enable InSAR to support applications such as monitoring earthquakes, volcanic activity, land subsidence, and infrastructure stability.

Phase unwrapping is a crucial step in the processing of Synthetic Aperture Radar (SAR) images, particularly in Interferometric SAR (InSAR) applications. When SAR images are processed to measure surface deformation or topography, the phase information is often wrapped within a range of $(-\pi)$ to $(\pi)$. This wrapping occurs because the phase is measured modulo $(2\pi)$, leading to discontinuities in the phase data. Disclosed embodiments enable phase unwrapping that can mitigate these discontinuities by adding the correct multiples of $(2\pi)$ to the wrapped phase values. The unwrapping process reconstructs the continuous phase information, which is essential for accurate elevation measurements and deformation analysis.

The architecture 800 accepts a first pass (pass 1) of input SAR I/Q (in-phase and quadrature) data 802, and a second pass (pass 2) of input SAR I/Q (in-phase and quadrature) data 842. The input SAR I/Q data 802 is input to an end-to-end discrete cosine transform (DCT) process 804. Similarly, the input SAR I/Q data 842 is input to an end-to-end discrete cosine transform (DCT) process 844. The output of the end-to-end DCT process 804 is provided to an amplitude extraction process 806 that provides amplitude data of the first pass to phase unwrapping system 852. Similarly, the output of the end-to-end DCT process 844 is provided to an amplitude extraction process 846 that provides amplitude data of the second pass to phase unwrapping system 852. In one or more embodiments, the amplitude extraction process 846 and amplitude extraction process 806 may include computing a magnitude based on the in-phase component and the quadrature component using the Pythagorean theorem. The interferogram wrapped phase 850 from the input SAR data is also provided to the phase unwrapping system 852. The phase unwrapping system 852 then outputs unwrapped phase 854. The unwrapped phase 854 includes data that serves to resolve phase ambiguity, providing a continuous phase representation that reflects actual surface displacement.

Figure 9:
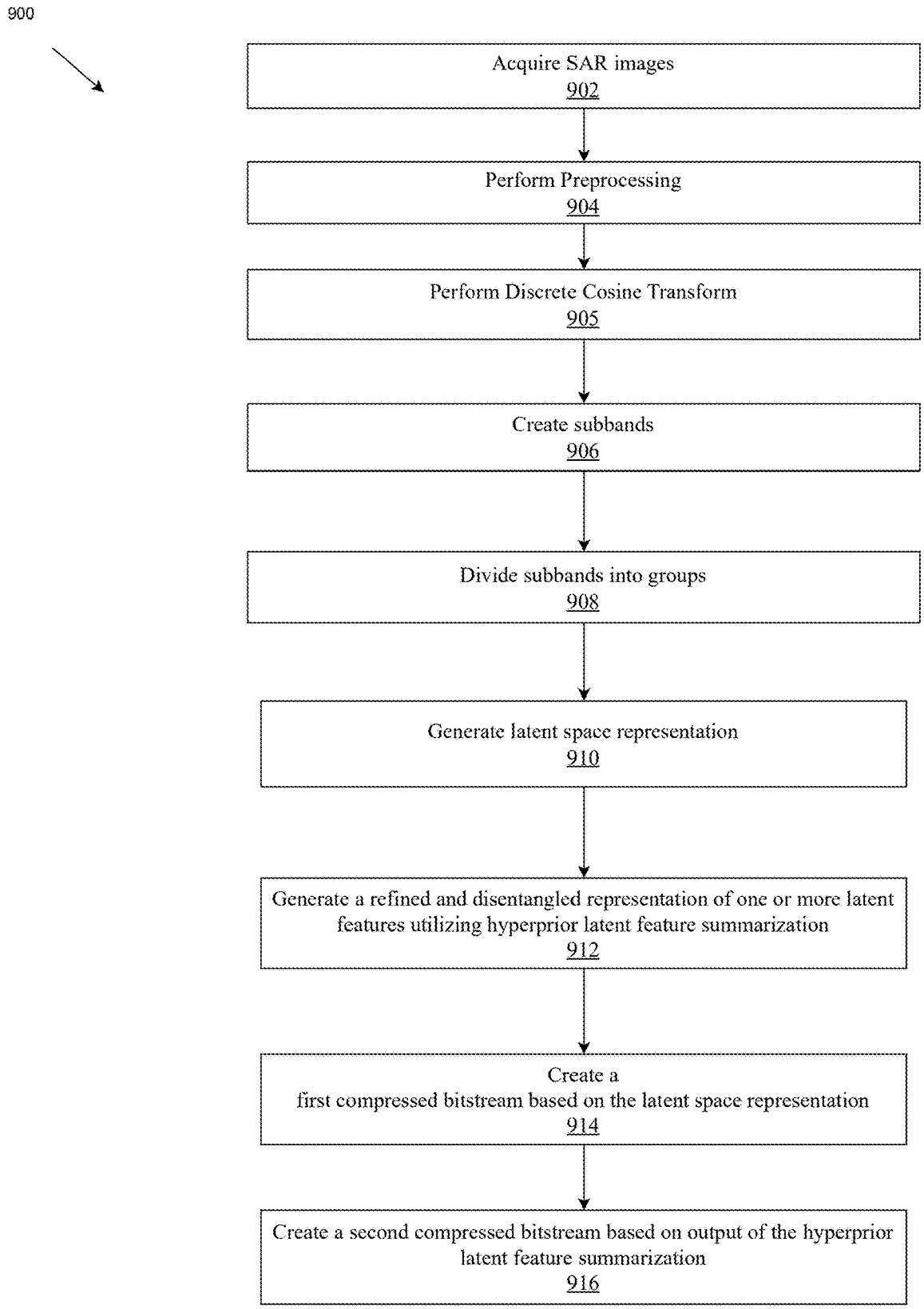
FIG. 9 is a flow diagram illustrating another exemplary method for compressing SAR image data, according to an embodiment.

FIG. 9 is a flow diagram illustrating another exemplary method 900 for compressing SAR image data, according to an embodiment. At block 902, SAR images are acquired. In embodiments, the SAR images can be stored in a format that represents pixels as complex numbers. The method 900 continues to block 904, where preprocessing is performed. The preprocessing can include image enhancement, filtering, noise reduction, edge enhancement, region of interest (ROI) identification, and so on. Additionally, the preprocessing can include adding metadata to the image. The metadata can include geographic information, date and/or time information, and/or other relevant information. Thus, in embodiments, the one or more image preprocessing operations includes a radiometric calibration process. In embodiments, the one or more image preprocessing operations includes a geometric calibration process. In embodiments, the one or more image preprocessing operations includes a noise reduction process. In embodiments, the noise reduction process includes a speckle filtering process. In embodiments, the one or more image preprocessing operations includes a region of interest (ROI) extraction process.

The method 900 continues to block 905, where a discrete cosine transform is performed. The discrete cosine transform can include performing a block-wise tokenization scheme. In embodiments, the discrete cosine transform may be performed utilizing a Discrete Cosine Transform Deblur (DCTD) network. The method 900 continues to block 906, where a plurality of subbands is created. The subbands can include a DC component, as well as multiple AC components of varying frequency ranges. The method 900 continues to block 908, where the subband is divided into groups. In embodiments two or more groups may be created, including one or more low frequency (LF) groups, and one or more high frequency (HF) groups. The method 900 continues with generating a latent space representation 910. In one or more embodiments, the latent space representation may be generated by an autoencoder on a subband basis. Embodiments can include discarding one or more subbands prior to generating the latent space representation. Embodiments can include computing a thumbnail version of the latent space representation. In embodiments, the latent space representation can be generated by a variational autoencoder instead of, or in addition to, an autoencoder. Thus, disclosed embodiments can transform raw data that can include complex pixel values of a SAR image into a suitable internal representation or feature vector. The method 900 continues to block 912, where a refined and disentangled representation of one or more latent features are generated utilizing hyperprior latent feature summarization. The refined and disentangled representation provides latent features that each capture a distinct and independent factor of variation in the data, and can enable generative modeling. Moreover, the refined and disentangled representation of one or more latent features can serve as a form of noise reduction in that unnecessary or irrelevant information is minimized, leading to more robust models. Thus, the refined and disentangled representation can enable improved classification and regression results.

In one or more embodiments, the hyperprior latent feature summarization includes using a secondary latent variable (the hyperprior) to improve the modeling of uncertainty and dependencies in the primary latent features for SAR image data. In one or more embodiments, the hyperprior latent feature summarization module comprises a Hierarchical Bayesian Network (HBN). The HBN can include a top layer for representing hyperparameters and/or priors. The HBN can include a bottom layer that represents observed SAR image data. The HBN can include one or more middle layers for capture of intermediate latent variables. In one or more embodiments, the HBN may be implemented with multiple nodes that are connected by edges, that serve as directed links to indicate causal and/or dependency relationships between nodes.

The method 900 continues to block 914 where a first compressed bitstream based on the latent space representation is created. In one or more embodiments, an arithmetic encoder is used to create the compressed bitstream. The arithmetic encoder can be configured to estimate a probability of a given symbol, and encode frequently occurring symbols with a smaller representation. All symbols are processed, and the assigned value is converted to a binary representation which forms the compressed bitstream. The method 900 continues to block 916, where a second compressed bitstream based on the output of the hyperprior latent feature summarization is created. The second compressed bitstream may be created using an arithmetic encoder in a similar manner to that described for block 914.

Figure 10:
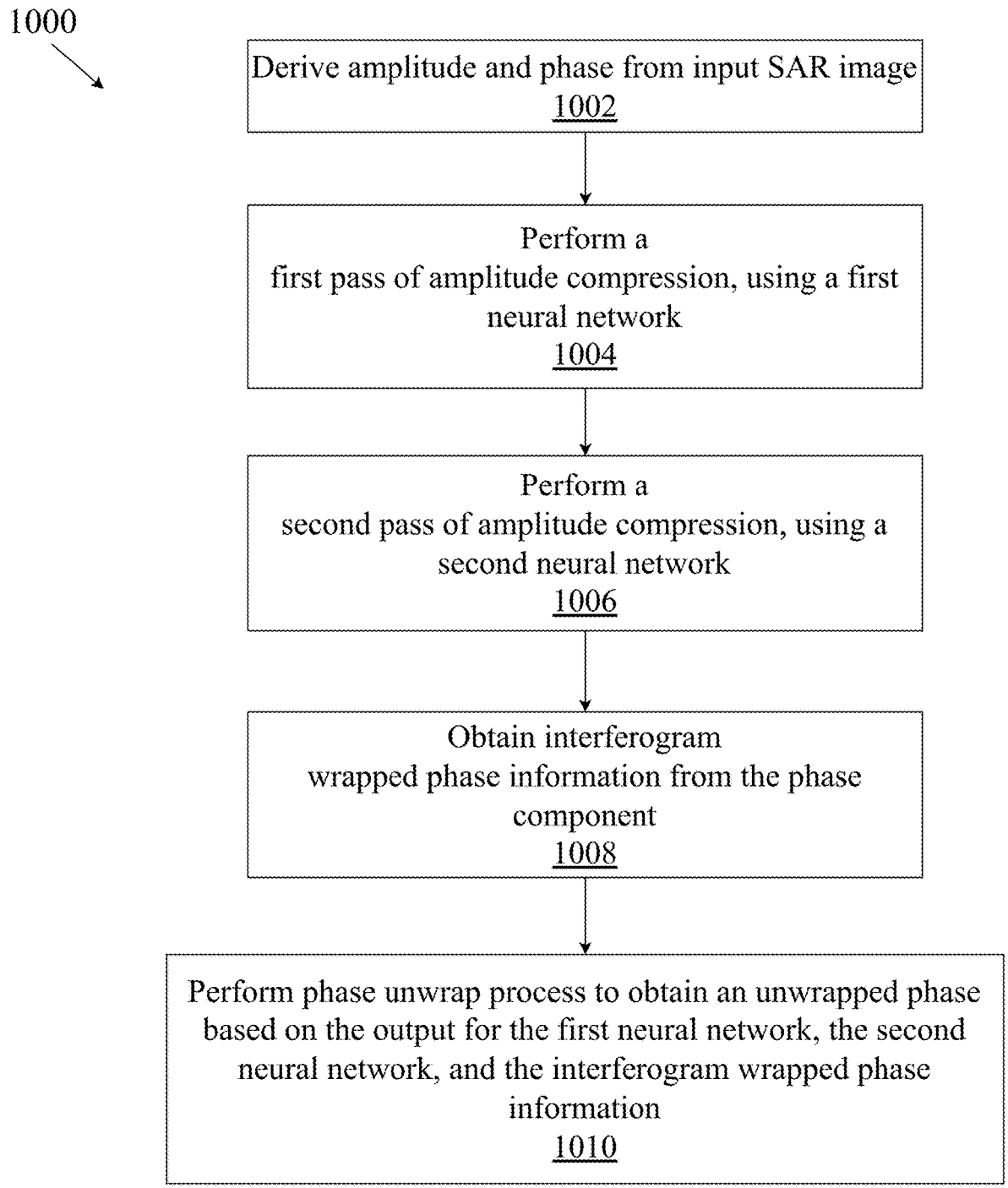
FIG. 10 is a flow diagram illustrating an exemplary method for interferometric synthetic aperture radar phase recovery and unwrapping, according to an embodiment.

FIG. 10 is a flow diagram illustrating an exemplary method 1000 for interferometric synthetic aperture radar phase recovery and unwrapping, according to an embodiment. The method 1000 starts with deriving amplitude and phase from an input SAR image at block 1002. The method 1000 continues with performing a first pass of amplitude compression, using a first neural network at block 1004. The method 1000 continues with performing a second pass of amplitude compression, using a second neural network at block 1006. In one or more embodiments, the first pass and second pass may be performed sequentially. In one or more embodiments, the first pass and second pass may be performed concurrently. The method 1000 continues with obtaining interferogram wrapped phase information from the phase component at block 1008. The method 1000 continues with performing a phase unwrap process to obtain an unwrapped phase based on the output for the first neural network, the second neural network, and the interferogram wrapped phase information, at block 1010. Embodiments can include: deriving an amplitude component and a phase component from the input SAR image; performing a first pass of amplitude compression, using a first neural network; performing a second pass of amplitude compression, using a second neural network; obtaining interferogram wrapped phase information from the phase component; and performing a phase unwrap process to obtain an unwrapped phase based on the output for the first neural network, the second neural network, and the interferogram wrapped phase information.

Figure 11:
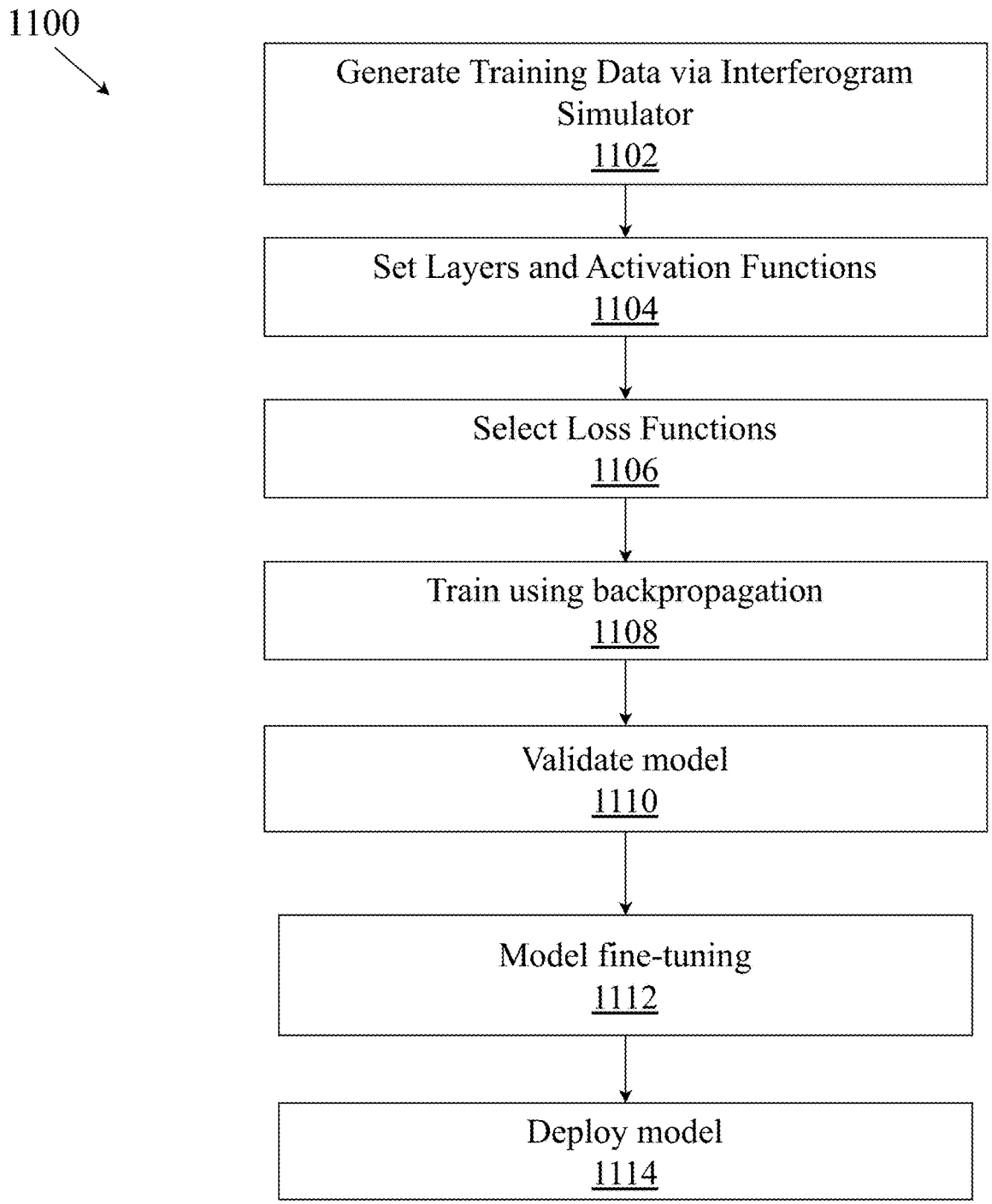
FIG. 11 is a flow diagram illustrating an exemplary method for training a system for compressing SAR image data using training data from an interferogram simulator, according to an embodiment.

FIG. 11 is a flow diagram illustrating an exemplary method 1100 for training a system for compressing SAR image data using training data from an interferogram simulator, according to an embodiment. The method 1100 starts at block 1102 where training data is generated via an interferogram simulator. In one or more embodiments, the interferogram simulator can provide training samples with strong generalization ability for model training. Deep learning, as a data-driven method, requires a large number of training samples to train network models. In practice, it can be challenging to obtain ground truth corresponding to InSAR data because it is difficult to collect high-resolution ground deformation information, which limits the application of deep learning in the field of InSAR. In one or more embodiments, the interferogram simulator generates data based on phase characteristics of a large number of real interferograms, various statistical models of InSAR data, as well as noise sources, and generates training samples by simulating the phase components of terrain, buildings, deformation, noise, water surface and atmosphere. Thus, the interferogram simulator can be used in the training of neural networks for a variety of tasks, such as interferogram denoising, deformation detection and phase unwrapping, thereby enabling an improved training process for training neural networks to perform SAR image data compression and/or decompression.

The method 1100 continues with setting layers and activation functions at block 1104. In a neural network, layers are the building blocks that form the structure of the network. Each layer consists of a collection of neurons (also called nodes or units), and each neuron performs a specific computation on the input data. The output of one layer becomes the input to the next layer, creating a series of transformations from the input to the output. The layers can include input layers, output layers, and/or hidden layers. The activation functions introduce non-linearity into the model, allowing it to learn and represent complex patterns in the data. In embodiments, the activation functions can include a sigmoid function, a hyperbolic tangent function, a rectified linear unit (ReLU), a Leaky ReLU, softmax function, and/or other suitable activation function. The method 1100 continues to block 1106 for selecting loss functions. The loss functions are mathematical functions used in machine learning to measure the difference between the predicted values produced by the model and the actual target values from the training data. In one or more embodiments, the loss functions can include Mean Squared Error (MSE), Mean Absolute Error (MAE), Categorical Cross-Entropy, and/or other suitable loss functions. The loss functions can be used to determine if the model is sufficiently trained. The method 1100 continues to block 1108 for training the model using backpropagation. The backpropagation process can include computing gradients of the loss with respect to the weights and biases in the output layer. These gradients are propagated backward through the neural network to the hidden layer. The method 1100 continues to block 1110, where the model is validated. The validation can include using an additional set of SAR images that were not part of the SAR training dataset as a test dataset. The test SAR images can be compressed, reconstructed, and the reconstructed SAR images can be compared with the original SAR test dataset to confirm proper operation of the model. The method 1100 can include model fine-tuning at block 1112. The model fine-tuning can include adjusting weights and/or other hyperparameters as needed to improve model output. The method 1100 continues to block 1114, where the model is deployed for use in satellites, aircraft, and/or other sources of SAR images. In this way, disclosed embodiments provide an efficient compression technique for compressing SAR images.

Exemplary Computing Environment

Figure 12:
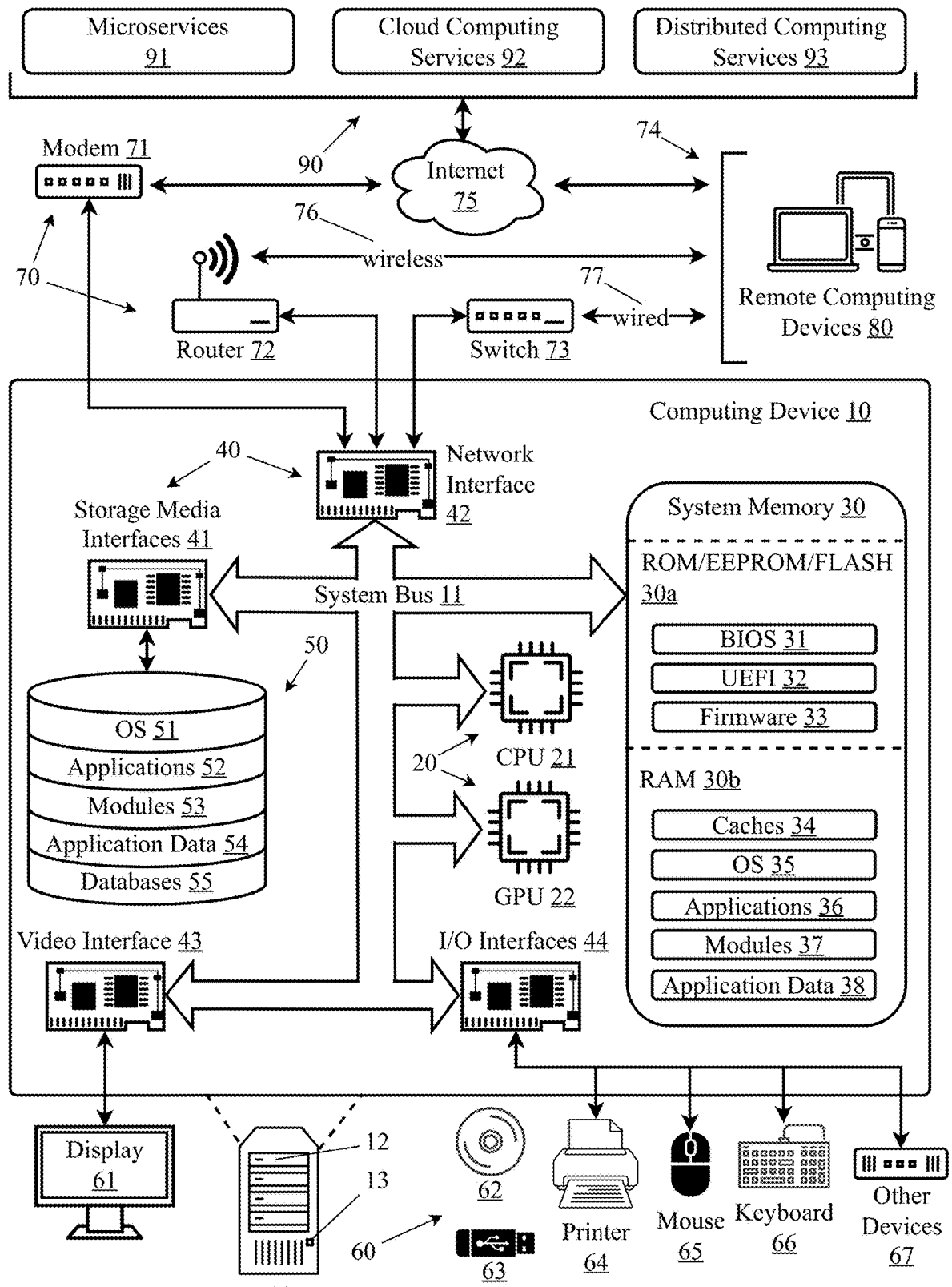
FIG. 12 illustrates an exemplary computing environment on which an embodiment described herein may be implemented, in full or in part.

FIG. 12 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid-state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program subsystems 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program subsystems 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

As can now be appreciated, disclosed embodiments provide improvements in data compression for SAR images. Disclosed embodiments provide a subband learning-based compression solution for SAR image compression, which has a divide-and-conquer strategy in dealing with redundancy in images by having a neural network encoder of latent representation, followed by a multi-stage context model that drives an arithmetic coding engine. This enables compressing of SAR images to reduce their file size, allowing for more efficient use of storage resources. Disclosed embodiments utilize a multiple pass amplitude compression scheme, which when combined with InSAR phase input, provides information for deriving unwrapped phase. Thus, disclosed embodiments provide improvements in InSAR phase recovery. Furthermore, the compressed SAR images require less bandwidth for transmission, making it faster to send and receive data over networks, including satellite links and the internet. Thus, disclosed embodiments enable SAR images to be transmitted more efficiently, promoting important applications such as environmental monitoring, reconnaissance, surveillance, meteorology, and others.

The skilled person will be aware of a range of possible modifications of the various aspects described above. Accordingly, the present invention is defined by the claims and their equivalents.

What is claimed is:

1. A system for image compression, comprising:
a computing device comprising at least a memory and a processor;
an image preprocessing subsystem comprising a first plurality of programming instructions that, when operating on the processor, cause the computing device to perform one or more image preprocessing operations on an input synthetic aperture radar (SAR) image, wherein the input SAR image comprises an in-phase component and a quadrature component;
a discrete cosine transform (DCT) subsystem comprising a second plurality of programming instructions that, when operating on the processor, cause the computing device to:
perform a DCT operation on the in-phase component of the input SAR image, and create a plurality of subbands for the in-phase component of the input SAR image, wherein each subband represents a frequency range; and
divide the plurality of subbands into multiple groups, wherein the multiple groups comprise a first low frequency group, a second low frequency group, and a high frequency group;
a compression subsystem comprising a third plurality of programming instructions that, when operating on the processor, cause the computing device to implement a latent feature encoding network, wherein the latent feature encoding network comprises:
a first kernel, the first kernel configured to provide output to a first plurality of residual blocks, the first plurality of residual blocks configured to provide output to a first attention network, the first attention network configured to provide output to a second plurality of residual blocks, the second plurality of residual blocks configured to provide output to a second kernel, and the second kernel configured to provide output to a second attention network, and wherein the latent feature encoding network is configured and disposed to generate a latent space representation corresponding to the input SAR image;
a first arithmetic coding subsystem comprising a fourth plurality of programming instructions that, when operating on the processor, cause the computing device to perform compression on one or more of the plurality of subbands, thereby creating a first compressed bitstream;
a hyperprior latent feature summarization module configured and disposed to receive input from the second attention network, and provide a refined and disentangled representation of one or more latent features as output; and
a second arithmetic coding subsystem comprising a fifth plurality of programming instructions that, when operating on the processor, cause the computing device to perform compression on the output of the hyperprior latent feature summarization module, thereby creating a second compressed bitstream;
wherein the first compressed bitstream and second compressed bitstream are combined into a compressed version of the input SAR image.

2. The system of claim 1, wherein the hyperprior latent feature summarization module is configured to compute a thumbnail version of the latent space representation.

3. The system of claim 1, wherein the hyperprior latent feature summarization module comprises a Hierarchical Bayesian Network (HBN).

4. The system of claim 1, wherein the first kernel is configured to have five channels and a stride value of 1.

5. The system of claim 1, wherein the second kernel is configured to have five channels and a stride value of 2.

6. The system of claim 1, wherein the first plurality of residual blocks comprises six residual blocks.

7. The system of claim 1, wherein the second plurality of residual blocks comprises three residual blocks.

8. The system of claim 1, wherein the compression subsystem further causes the processor to discard one or more subbands prior to generating the latent space representation.

9. The system of claim 1, wherein the discrete cosine transform (DCT) subsystem further comprises programming instructions that when operating on the processor, cause the processor to perform a DCT operation on the quadrature component of the input SAR image, and create a second plurality of subbands for the quadrature component of the input SAR image.

10. A method for image compression, comprising:
performing one or more image preprocessing operations on an input synthetic aperture radar (SAR) image, wherein the input SAR image comprises an in-phase component and a quadrature component;
performing a discrete cosine transform (DCT) operation on the in-phase component of the input SAR image, and create a plurality of subbands for the in-phase component of the input SAR image, wherein each subband represents a frequency range;
dividing the plurality of subbands into multiple groups, wherein the multiple groups comprise a first low frequency group, a second low frequency group, and a high frequency group;
generating a latent space representation corresponding to the multiple groups of subbands;
generating a refined and disentangled representation of one or more latent features utilizing hyperprior latent feature summarization;
creating a first compressed bitstream based on the latent space representation; and
creating a second compressed bitstream based on output of the hyperprior latent feature summarization;
wherein the first compressed bitstream and second compressed bitstream are combined into a compressed version of the input SAR image.

11. The method of claim 10, wherein the one or more image preprocessing operations includes a radiometric calibration process.

12. The method of claim 10, wherein the one or more image preprocessing operations includes a geometric calibration process.

13. The method of claim 10, wherein the one or more image preprocessing operations includes a noise reduction process.

14. The method of claim 13, wherein the noise reduction process includes a speckle filtering process.

15. The method of claim 10, wherein the one or more image preprocessing operations includes a region of interest (ROI) extraction process.

16. The method of claim 10, further comprising:
deriving an amplitude component and a phase component from the input SAR image;
performing a first pass of amplitude compression, using a first neural network;
performing a second pass of amplitude compression, using a second neural network;
obtaining interferogram wrapped phase information from the phase component; and
performing a phase unwrap process to obtain an unwrapped phase based on the output for the first neural network, the second neural network, and the interferogram wrapped phase information.

17. A non-transitory, computer-readable medium comprising programming instructions for an electronic computation device executable by a processor to cause the electronic computation device to:
perform one or more image preprocessing operations on an input synthetic aperture radar (SAR) image, wherein the input SAR image comprises an in-phase component and a quadrature component;
perform a discrete cosine transform (DCT) operation on the in-phase component of the input SAR image, and create a plurality of subbands for the in-phase component of the input SAR image, wherein each subband represents a frequency range;
divide the plurality of subbands into multiple groups, wherein the multiple groups comprise a first low frequency group, a second low frequency group, and a high frequency group;
generate a latent space representation corresponding to the multiple groups of subbands;
generate a refined and disentangled representation of one or more latent features utilizing hyperprior latent feature summarization;
create a first compressed bitstream based on the latent space representation; and
create a second compressed bitstream based on output of the hyperprior latent feature summarization;
wherein the first compressed bitstream and second compressed bitstream are combined into a compressed version of the input SAR image.

18. The computer-readable medium of claim 17, wherein the computer-readable medium further comprises programming instructions that, when executed by the processor, cause the electronic computation device to:
derive an amplitude component and a phase component from the input SAR image;
performing a first pass of amplitude compression, using a first neural network;
perform a second pass of amplitude compression, using a second neural network;
obtain interferogram wrapped phase information from the phase component; and
perform a phase unwrap process to obtain an unwrapped phase based on the output for the first neural network, the second neural network, and the interferogram wrapped phase information.

19. The computer-readable medium of claim 17, wherein the computer-readable medium further comprises programming instructions that, when executed by the processor, cause the electronic computation device to compute a thumbnail version of the latent space representation.

20. The computer-readable medium of claim 17, wherein the computer-readable medium further comprises programming instructions that, when executed by the processor, cause the electronic computation device to perform a DCT operation on the quadrature component of the input SAR image, and create a second plurality of subbands for the quadrature component of the input SAR image.

* * * * *